Patented Nov. 28, 1933

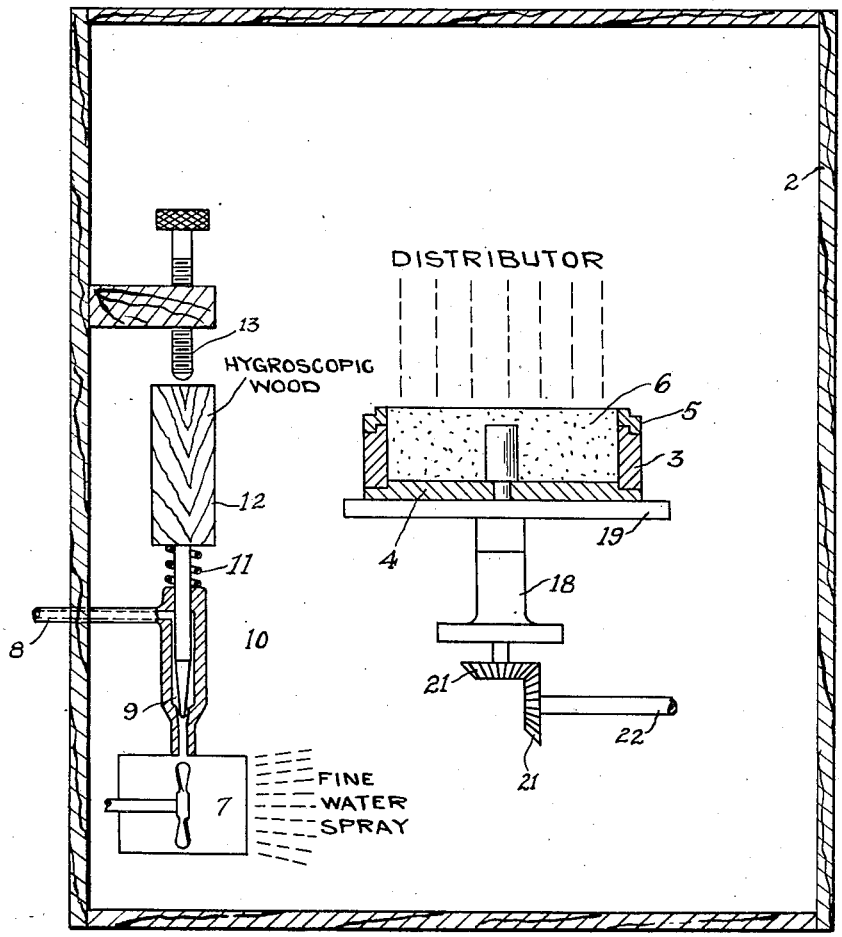

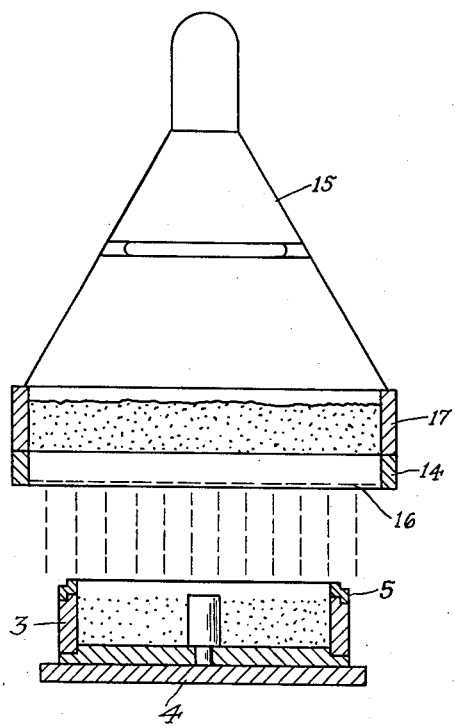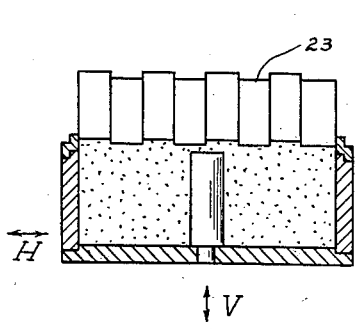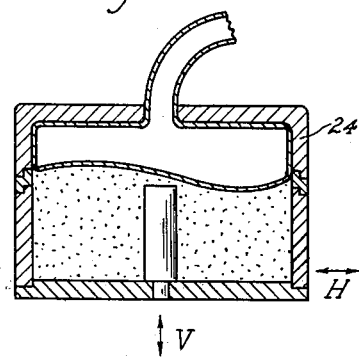

1,936,820

UNITED STATES PATENT OFFICE 1,936,820

METHOD AND APPARATUS FOR INCREASING THE UNIFORMITY OF ABRASIVE AND CERAMIC ARTICLES

Raymond C. Benner, Prescott H. Walker, and William G. Soley, Niagara Falls, N. Y., assignors to The Carborundum Company, Niagara Falls, N. Y., a corporation of Pennsylvania Application September 27, 1929
Serial No. 395,707

10 Claims. (Cl. 25—1)

The invention relates particularly to the forming, molding and pressing of ceramic objects from a mix moistened with water in an atmosphere containing a controlled amount of moisture. We describe therefore a process and apparatus by which important physical characteristics of ceramic articles, and in particular the properties of abrasive articles, are controlled by varying the amount of moisture in the mix.

This application is a continuation in part of our copending application U. S. Serial No. 245,659, filed January 10, 1928. It is also related to our other copending applications U. S. Serial No. 298,215, filed August 8, 1928; U. S. Serial No. 335,519 filed Jan. 28, 1929 and U. S. Serial No. 335,520, filed Jan. 28, 1929. The object of the inventions described in these copending applications is the securing of more uniform abrasive mixes by such methods as screening the abrasive mixture into the mold as disclosed and claimed in our copending application Serial No. 245,659, jolting the mold during the application of a preliminary consolidating pressure previously to the striking off of excess mix as disclosed and claimed in our copending application Serial No. 335,519 and/or applying a uniform pressure by means of an inflated bag to the upper surface of the abrasive mix during the period of preliminary pressure as disclosed and claimed in our copending application Serial No. 335,520. These methods are used in the case of damp mixes containing only about 2.5 per cent of water as distinguished from wet mixes such as are used in the puddle process. However, the present invention is also applicable to silicate mixes, which contain considerably more water than the above figure.

There are certain advantages derived from the use of a damp mix, in distinction from the so-called wet mixes. Articles made from the former need only a short time for drying and require little shaving or dressing to bring them to size and shape, since they may be molded directly to the desired form by tamping and pressing. The chief difficulty encountered in the use of such mixes is that of lack of uniformity in the finished product. The articles, whether tamped or pressed, are liable to have uneven porosity compared with those made by the ordinary puddle process. Variations occur in physical properties not only of articles made at different times, but even in different parts of the same article.

We have found that the physical properties of the finished product vary with the amount of water in the ceramic mix, and that by controlling the amount of water in the mix, we can alter the physical properties of the product at will and minimize or obviate the lack of uniformity in the physical properties.

Even when the abrasive or ceramic mixture has initially the correct moisture content, varying amounts are lost during the process of fabrication, depending upon the temperature and humidity of the surrounding atmosphere. If the mix is stored and dries out to too great an extent before use, difficulties arise, particularly in the case of ceramically bonded abrasive articles. As the drying out continues the bond tends to separate from the abrasive grains. On the other hand, when the mix has the proper moisture content the bond sticks to the grains and remains in contact therewith during the process of manufacture.

In addition to the uneven distribution of the bond and grain in the case of mixes which are too dry, the packing or compacting of the mix ingredients under pressure varies to a much greater extent than when a mix of the proper moisture or water content is used. This results in abrasive wheels which for example, vary in density and hardness from side to side and in radial directions. It is impossible to duplicate wheels from a given mix which is too dry.

In order to repeatedly reproduce abrasive wheels of a given character from a mixture of abrasive grains of a given character and a given kind of bond it is necessary that the plasticity of the bond should be constant and that the packing or distribution in space of the abrasive grains and bond should be constant from wheel to wheel. For a given constitution of abrasive grains and bond and a given applied pressure the packing will depend upon the moisture content. The uniformity of the mix will depend however not only on the moisture content but also on the manner in which the mix is added to the mold and on the way in which the preliminary pressures are applied.

With silicate mixes the bond is greatly affected by the amount of water present. During the dehydration of the silicate which takes place in the process of manufacture a bond may be produced which will have entirely different characteristics from one containing a different quantity of water.

In the ordinary methods of making abrasive wheels an abrasive mix of suitable proportions of bond and grain is kept in cans from which it is transferred to molds from time to time as needed. The transfer of the mix in such processes has usually been accomplished by shovelling. In some cases tamping is resorted to in order to consolidate the mix in the mold. Such a method of consolidation depends on the skill of the operator and is likely to be a more or less haphazard proceeding in which voids are left in portions of the mix within the mold. The mix is then levelled off and pressed in the mold. To preserve the moisture content wet cloths are placed over the exposed surfaces of the cans during the intervals between the transfer of material. With a process of this sort it is inevitable that some portions of the mix should be drier than others.

In our improved process the abrasive mix of pre-determined moisture content is kept in a room in which the atmosphere is controlled by means of a humidifier of the cold water spray or other suitable type, and the operations preliminary to pressing are conducted in an atmosphere of controlled humidity. The amount of water spray delivered to the enclosing chamber may be automatically regulated according to the percentage of moisture which it is desired to maintain in the mix by means of fibrous material which absorbs moisture. The regulation to a certain percentage humidity may be accomplished by setting a screw so that a wooden strip for example regulates the opening of a valve in the spray line, or by other of the methods well known in the art.

In the screening and molding operations, the moisture in the mix is controlled in order to obtain uniformity in the finished product. These operations are conducted in a chamber where the humidity is regulated as described above. This may be accomplished by a casing surrounding the screen and mold, the moisture being controlled by a Bronson or other type of self-regulating humidifier. In some cases the humidity should be approximately that of saturation at the temperature at which the mold-filling operation is conducted; with other mixes the humidity should be considerably below that of saturation.

Any of the ordinary methods of molding may be employed, the application of our invention being embodied in controlling the moisture content of the mix by conducting these operations in an atmosphere of controlled humidity. For uniformity and distribution of the mix, we prefer in some cases to use the methods described at length in our co-pending applications referred to above, as illustrated in the accompanying drawings in which:

Figure 1 represents a vertical section of a humidity chamber containing apparatus for obtaining an approximately uniform distribution of grain and bond, portions of the apparatus being indicated in section and other portions diagrammatically;

Figure 2 is a vertical section of a vibratable screen;

Figure 3 is a vertical section of a mold in which the uniform distribution of grain and bond is assisted by jolting in various directions while the upper surface of the mix is exposed to the action of a plurality of weights; and Figure 4 is a view similar to Figure 3 of a mold in which the uniform distribution of grain and bond is assisted by the application of pressure to the upper surface of the mix by means of a rubber bag into which air, water, or other fluid may be admitted under pressure. With the use of the rubber bag, pressure is applied uniformly at right angles to each small area of the upper surface of the mix.

Referring to the drawings in detail, the casing 2 encloses a humidity chamber which contains mold 3 having a base 4 and a strike-off ring 5 interfitting with the mold body. 6 indicates a damp mix which is charged into the mold. The mold is supported on a table 19 which in turn is supported on a pedestal 18.

To the left of Figure 1 humidifying apparatus is indicated in a conventional manner as we do not wish to limit ourselves to any particular form of such apparatus. It is desirable however that the apparatus should be capable of automatically maintaining the humidity of the chamber at a value which will keep the moisture content of the abrasive mix constant during the processing which precedes the application of the final forming pressure. The humidifying apparatus includes a sprayer 7 capable of delivering a very fine spray. Water is furnished by a pipe 8 from which it passes into a valve chamber 9. The valve rod 10 is normally maintained in a mean position by a spring 11. When the air in the chamber 2 gets too moist the expansion of the wooden block 12 causes it to abut against the adjustable screw 13 and then push the rod 10 in a direction to shut off the water supply to the humidifier 7. When the atmosphere gets too dry the contraction of the block 12 serves to increase the water supply.

Any type of distributor may be used with the mold shown in Fig. 1. We may for example distribute the mix into the mold from a gyratory riddle 15, usually somewhat larger than the mold, as shown 14, 16 and 17 in Figure 2; the mesh of the lower screen 16 should be less than five times that of the diameter of the particles to be distributed into the mold.

The mold may be mounted on a table which is rotated by a drive (shown in part at 21, 21 and 22 in Fig. 1) while the mix is added to the mold.

When the mold is filled to the top of the strike-off ring 5 the excess mix is carefully removed by removing the ring and levelling off with a straight edge so that the mix is not disturbed and is of uniform thickness.

Before removing the strike-off ring, however, the uniformity in density and relative bond and grain distribution may be improved by jolting the mold in horizontal and vertical directions simultaneously with the application of pressure to the upper surface of the mix in such a way as to permit the denser portions of the mix to expand and the lighter portions of the mix to become more dense until approximate uniformity is obtained as indicated in Figures 3 and 4. Means for jolting are indicated only diagrammatically by the arrows H and V which may be understood to indicate that means are used for jolting in horizontal and vertical directions respectively. Means for this purpose are indicated in detail in our copending application, U. S. Serial No. 335,519, filed Jan. 28, 1929. It should be understood that the pressure applied as indicated in Figures 3 and 4 is only a preliminary pressure applied before the excess mix is struck off. After the excess mix is struck off as indicated above a final forming pressure is applied to the mix in the mold.

In practically any molding operation for abrasive articles, and in the screening process described above in particular, there is a great tendency for non-uniform drying of the abrasive mix. With our discovery that it is possible to vary the physical properties of the abrasive article by variation in the moisture or water content of the mix, together with the application of an atmosphere of pre-determined humidity to the various processes intervening between mixing and final pressing, it has been possible to obtain abrasive articles which not only have very desirable physical properties, but also have greater uniformity than has been possible with any previous process. In combination with the processes described in the above mentioned co-pending applications particularly advantageous results are obtained. That a certain optimum moisture content must be maintained in the stored abrasive mixture if articles of uniform quality are to be obtained is illustrated by the following table, in which the strengths of abrasive articles made from mixes having the normal moisture content are compared with the corresponding values when there is only half of the normal moisture content in the mixture in the mold:

| Strength | Normal moisture content | One half normal moisture content | Loss strength | Percent loss |
| --- | --- | --- | --- | --- |
| Tensile | 1650 | 1370 | 280 | 17 |
| Shear | 3430 | 3010 | 420 | 12.2 |
| Transverse | 3000 | 2680 | 320 | 10.7 |
| Compressive | 10600 | 8400 | 2200 | 19 |

The loss of fifty percent of the normal moisture content from the mix therefore causes a notable loss of strength in the finished article.

The hardness and tenacity of the resultant article are likewise affected adversely if the mix is too dry.

The density of the article may likewise be controlled within limits by varying the amount of moisture, and variations in other physical properties are known to be more or less dependent on this factor.

Although it has been found preferable to use an atmosphere in which the humidity is controlled, it is also possible to add the required amount of water in case the moisture content of the mix as determined by analytical methods is below a pre-determined value which has been found to give uniformity and satisfactory or desired physical properties. After such addition, the mix may be molded as described above.

In some cases it is possible to increase the moisture of the mix to the desired value by exposing to a humid atmosphere, the moisture content of which is controlled by a humidifier. The possibility of accomplishing this result depends upon the nature and hygroscopic properties of the mix, assuming constant temperature conditions and no supersaturation of the air in the humidity chamber.

We do not wish to limit ourselves to the particular examples of our process that have been described. The spirit of our invention is indicated by the scope of the following claims.

We claim:

1. The step in the process of manufacturing an abrasive article which comprises transferring the abrasive mix to the mold in an atmosphere of controlled humidity.

2. The steps in the process of manufacturing an abrasive article which comprise maintaining the abrasive mix with a pre-determined moisture content in a chamber in which the humidity is automaticaly controlled and adding the mix to the mold under the same atmospheric conditions.

3. Apparatus for the manufacture of abrasive and ceramic articles of great uniformity of structure comprising a distributor screen, a mold placed below the screen, a humidity chamber surrounding said distributor and mold, and means for keeping the water vapor pressure of the atmosphere within the chamber at a predetermined value.

4. Apparatus for the manufacture of abrasive and ceramic articles of great uniformity of structure comprising a vibrating screen, a mold placed below the screen, a humidity chamber surrounding said screen and mold, and means for keeping the water vapor pressure of the atmosphere within the chamber at a predetermined value.

5. Apparatus for producing an article of uniform density comprising a rotatable mold, a vibrating screen spaced above the mold whose area exceeds the area of the mold, and whose mesh does not exceed five times the average diameter of the particles to be distributed into the mold, a humidity chamber surrounding said screen and mold, and means for keeping the water vapor pressure of the atmosphere within the chamber at a predetermined value.

6. The steps in the method of making articles of uniform density which comprise screening particles of an uncured mixture into a mold and maintaining an atmosphere of constant humidity around the said particles which will keep their moisture content constant during the screening process.

7. The steps in the method of making an abrasive article from a damp mix of abrasive grains and a bonding agent which comprises changing the water content of the mix to a predetermined value and then depositing the mix in a mold from a source which causes the mix to fall in substantially uniformly scattered increments at regular intervals over the cross-sectional area of the mold.

8. The steps in the method of making an abrasive article from a damp mix of abrasive grains and a bonding agent which comprise changing the water content of the mix to a predetermined value, depositing the mix from a gyratory riddle into a mold and to some distance above the plane of the upper surface of the mold, and subjecting the remaining mix to a preliminary consolidating pressure by means which acts uniformly at right angles to each small area of the upper surface of the mix, and striking off the excess mix.

9. The method described in claim 8 in which the mold is subjected to jolting action during the preliminary consolidating pressure.

10. The steps in the method of making an abrasive article from a damp mix of abrasive grains and a bonding agent which comprise changing the water content of the mix to a predetermined value, depositing the mix into a mold from a source which causes the mix to fall in substantially uniformly scattered increments at regular intervals over the cross-sectional area of the mold, and simultaneously rotating the mold and subjecting it to jolting, and striking off the excess mix, and subjecting the remaining mix to a preliminary consolidating pressure by means which acts uniformly at right angles to each small area of the upper surface of the mix.

RAYMOND C. BENNER.
PRESCOTT H. WALKER.
WILLIAM G. SOLEY.